Patented Sept. 2, 1947

2,426,961

UNITED STATES PATENT OFFICE 2,426,961

PROCESS FOR PREPARING METALDEHYDE

Richard S. Wilder, Elkins Park, Pa., assignor to Publicker Industries Inc., Philadelphia, Pa.

No Drawing. Application November 2, 1944,
Serial No. 561,643

9 Claims. (Cl. 260—340)

The present invention relates to the production of metaldehyde and it relates more particularly to a process for producing metaldehyde in relatively high yields by polymerizing acetaldehyde.

An object of the present invention is to provide a new and improved process for producing metaldehyde by polymerization of acetaldehyde. Another object of the present invention is to provide a process for polymerizing acetaldehyde to give high yields of metaldehyde while minimizing the production, and preventing the precipitation, of paraldehyde.

Other objects and advantages of the present invention are apparent in the following detailed description and appended claims.

Metaldehyde $(CH_3CHO)_4$ has been known since 1835 (Ann. 14. 141). It is prepared by treating acetaldehyde at low temperatures with small amounts of acidic substances which catalyze polymerization. However, paraldehyde $(CH_3CHO)_3$ is ordinarily simultaneously formed in much larger quantities and, indeed, unless the proper catalyst is employed and the temperature carefully controlled, the latter polymer is virtually the only product formed; the amount of metaldehyde formed being so small that little or none of it crystallizes out. Various special catalysts have been suggested in the past which favor the formation of metaldehyde, making possible metaldehyde yields of from four to eight per cent; as shown for example in the following United States patents: Lüscher et al. 1,467,733, Lüscher et al. 1,555,223, Lichtenhahn et al. 1,612,032, Lüscher et al. 1,693,204 and Lüscher et al. 1,804,357. In all cases, the best yields are obtained when the polymerization is conducted at temperatures below 10-15° C.

Since the principal product, paraldehyde, has a melting point of 10° C., the reaction mixture becomes almost completely solid before polymerization is complete. This solidification of the reaction mixture makes difficult the recovery of metaldehyde therefrom since it necessitates warming of the reaction mixture above 10° C. in order to melt the paraldehyde before filtering off the desired product. Furthermore, the resulting delay and the rise in temperature adversely affect the yield of metaldehyde.

I have now found that, by carrying out the polymerization of the acetaldehyde in the presence of an ether, I obtain much better results, in that precipitation of the paraldehyde is prevented at temperatures as low as −20° C. and furthermore, considerably higher yields of metaldehyde are obtained than have ever been previously obtainable by the processes of the prior art.

Diethyl ether has been found to be particularly suitable in improving the yield of metaldehyde and in preventing precipitation of paraldehyde. Generally speaking, however, other aliphatic ethers have been found satisfactory including, for example, methyl ethyl ether, di-isopropyl ether, di-n-propyl ether, di-butyl ether, di-isobutyl ether, di-methyl and di-ethyl ethers of ethylene glycol, cyclic ethers such as dioxane, etc.

I prefer to employ for this purpose aliphatic ethers containing not more than eight carbon atoms.

It is necessary to use only sufficient ether to prevent precipitation of the paraldehyde; approximately 7 to 15 per cent of the weight of the acetaldehyde being adequate in most cases.

While the ether prevents precipitation of the paraldehyde, it does not affect the precipitation of the metaldehyde and, accordingly, the latter can be recovered by filtration.

After the metaldehyde has thus been removed, the ether and acetaldehyde can be recovered by distilling the filtrate in the presence of a small amount of acid, which depolymerizes the paraldehyde.

If, however, it is desired to recover the paraldehyde as well, the filtrate can be neutralized, by adding a little sodium carbonate or other suitable alkaline agent, and then distilled, whereby ether is recovered from the distillate and paraldehyde is obtained in good yield as a higher fraction.

The following are illustrative, but not restrictive, examples of the process of my present invention:

*Example I*

Approximately seven parts (by weight) of diethyl ether is mixed with approximately 100 parts of acetaldehyde and the mixture is cooled to approximately −20° C. A catalyst, comprising approximately 0.48 part of 35% hydrobromic acid and approximately 0.15 part of pyridine, is then added with thorough stirring and cooling; the catalyst being added at such a rate that the temperature of the exothermic reaction mixture does not rise above approximately 0° C. The metaldehyde begins to crystallize out while the catalyst is still being added. No precipitation whatever of paraldehyde occurs. The mixture is agitated for approximately one hour at approximately −5° to 0° C. and is then filtered. After removing the filtrate from the receiver, the white, crystalline metaldehyde is washed with water and dried. The filtrate is transferred to a still and heated. In the presence of the residual acidic catalyst, depolymerization of the paraldehyde occurs and acetaldehyde and ether distill off. I have found that it is unnecessary to fractionate the distillate as the distilled mixture of aldehyde and ether is quite suitable as such for reuse in the process. The yield of metaldehyde obtained by the above-described process is 10 to 12 per cent higher than that obtained when the diethyl ether is omitted.

The process can be carried out using different catalysts, as for example, urea-hydrobromide or aniline-hydrobromide with hydrobromic acid with comparable results; the yield in each case being significantly higher than when the polymerization is conducted in the absence of the diethyl ether.

*Example 2*

A mixture of approximately 100 parts of acetaldehyde and approximately 7 parts of diethyl ether is cooled to approximately −20° C. and to the cooled mixture is added approximately 0.5 part of calcium bromide followed by cautious addition of approximately 0.15 part of hydrobromic acid. The mixture is stirred for approximately one hour below 10° C. and filtered. The presence of the di-ethyl ether prevents precipitation of paraldehyde and results in a good yield of substantially pure white crystalline metaldehyde which is separated by filtration; the yield obtained being approximately 10 per cent higher than that obtained when the process is carried out without the addition of the di-ethyl ether.

Just sufficient sodium carbonate is added to the filtrate to neutralize the hydrobromic acid present, and the mixture is then fractionally distilled. The ether comes off with the first low-boiling fraction while the fraction boiling at about 124° C. is practically pure paraldehyde.

In place of the calcium bromide and hydrobromic acid catalyst, other catalysts can be employed such as metal bromides or combinations of a metal haloid with an acidic substance.

*Example 3*

The procedure of Example 2 is repeated except that methyl ethyl ether is used in place of the di-ethyl ether with comparably good results.

*Example 4*

The procedure of Example 1 was repeated using di-n-propyl ether in place of the di-ethyl ether with comparably good results.

*Example 5*

A mixture of approximately 100 parts of acetaldehyde and approximately 10 parts of dioxane is cooled to approximately −20° C. and to the cooled mixture is added approximately 0.45 part of pyridine hydrobromide plus hydrobromic acid catalyst, containing approximately 0.15 per cent free HBr; the catalyst being added cautiously with thorough agitation and cooling so that the temperature of the reaction mixture does not rise above approximately −10° C. Thereafter, the mixture is agitated at approximately −10° to 0° for approximately one hour and is then filtered. Precipitation of the paraldehyde is prevented and metaldehyde in the form of substantially pure white crystals is obtained in a yield approximately 10 per cent higher than that resulting when the dioxane is omitted.

Either acetaldehyde or paraldehyde can be recovered from the filtrate according to the procedures outlined in connection with Examples 1 and 2, above.

*Example 6*

Approximately 200 parts of acetaldehyde is mixed with approximately 14 parts of di-isopropyl ether and the mixture is cooled to approximately −20° C. Pyridine-hydrobromic acid catalyst (equivalent to approximately 0.15% HBr and approximately 0.30% pyridine hydrobromide) is then added slowly with efficient stirring and cooling so that no appreciable rise in temperature occurs. After the catalyst has all been added, the temperature is allowed to rise slowly and uniformly over a four hour period to 15° C. and the mixture is then filtered. The white crystalline metaldehyde is thoroughly washed with water and dried. The yield of metaldehyde is approximately 10 to 12 per cent higher than that obtained when the di-isopropyl ether is omitted.

*Example 7*

The procedure of Example 6 was repeated using dibutyl ether in place of di-isopropyl ether with comparably good results; either acetaldehyde or paraldehyde being recoverable from the filtrate as previously described.

The present invention may be embodied in other specific forms without departing from the spirit or essential attributes thereof and it is therefore desired that the present embodiments be considered in all respects as illustrative and not restrictive, reference being had to the appended claims rather than to the foregoing description to indicate the scope of the invention.

Having thus described my invention, what I claim as new and desire to protect by Letters Patent is:

1. A process for preparing metaldehyde which comprises polymerizing acetaldehyde below approximately 15° C. in the presence of an aliphatic ether.

2. A process for preparing metaldehyde which comprises polymerizing acetaldehyde below approximately 15° C. in the presence of an acidic polymerization catalyst and an aliphatic ether and recovering precipitated metaldehyde from the reaction mixture by filtration.

3. A process for preparing metaldehyde which comprises polymerizing acetaldehyde below approximately 15° C. in the presence of an aliphatic ether containing not more than 8 carbon atoms.

4. A process for preparing metaldehyde which comprises polymerizing acetaldehyde below approximately 15° C. in the presence of an acidic polymerization catalyst and an aliphatic ether, containing not more than 8 carbon atoms, and recovering precipitated metaldehyde from the reaction mixture by filtration.

5. A process for preparing metaldehyde which comprises polymerizing acetaldehyde below approximately 15° C. in the presence of di-ethyl ether.

6. A process for preparing metaldehyde which comprises polymerizing acetaldehyde below approximately 15° C. in the presence of an acidic polymerization catalyst and di-ethyl ether and recovering precipitated metaldehyde from the reaction mixture by filtration.

7. A process for preparing metaldehyde which comprises polymerizing acetaldehyde below approximately 15° C. in the presence of di-isopropyl ether and thereafter recovering metaldehyde by filtration from the reaction mixture.

8. A process for preparing metaldehyde which comprises polymerizing acetaldehyde below approximately 15° C. in the presence of dioxane and thereafter recovering metaldehyde by filtration from the reaction mixture.

9. A process for preparing metaldehyde which comprises mixing approximately 100 parts by weight of acetaldehyde with approximately 7 to 15 parts by weight of an aliphatic ether containing not more than 8 carbon atoms, cooling the mixture to approximately 0° C. to −20° C., slowly adding an acidic polymerization catalyst while cooling the reaction mixture so that its temperature does not rise appreciably above 0° C. during the addition, and thereafter recovering substantially pure precipitated metaldehyde from the reaction mixture by filtration.

RICHARD S. WILDER.

REFERENCES CITED

The following references are of record in the file of this patent:

UNITED STATES PATENTS

| Number | Name | Date |
|---|---|---|
| 2,318,341 | Thompson | May 4, 1943 |
| 2,327,570 | Vogel | Aug. 20, 1943 |
| 1,300,451 | Morton et al. | Apr. 15, 1919 |

OTHER REFERENCES

Merck Index, 5th edition, pages 352 and 413.